(12) United States Patent
Ebersbach

(10) Patent No.: US 10,675,913 B2
(45) Date of Patent: Jun. 9, 2020

(54) BICYCLE WHEEL HUB WITH POWER METER

(71) Applicant: Specialized Bicycle Components, Inc., Morgan Hill, CA (US)

(72) Inventor: Wolfgang Ebersbach, Heuweiler (DE)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 429 days.

(21) Appl. No.: 15/192,427

(22) Filed: Jun. 24, 2016

(65) Prior Publication Data
US 2017/0368871 A1    Dec. 28, 2017

(51) Int. Cl.
*B60B 27/00*    (2006.01)
*B60B 27/02*    (2006.01)
(Continued)

(52) U.S. Cl.
CPC ........ *B60B 27/0068* (2013.01); *B60B 27/023* (2013.01); *B60B 27/04* (2013.01);
(Continued)

(58) Field of Classification Search
CPC ... B60B 27/0068; B60B 27/02; B60B 27/023; B60B 27/04; B62J 2099/002; B62K 25/02; G01L 3/105; G01L 5/13
See application file for complete search history.

(56) References Cited

U.S. PATENT DOCUMENTS

| 6,199,021 B1 | 3/2001 | Cote et al. |
| 6,356,848 B1 | 3/2002 | Cote et al. |

(Continued)

FOREIGN PATENT DOCUMENTS

| WO | 2012040386 A1 | 3/2012 |
| WO | 2014142577 A1 | 9/2014 |

(Continued)

OTHER PUBLICATIONS

Search Report for Great Britain Application No. 1709762.7, dated Jul. 25, 2017, 4 pages.

*Primary Examiner* — Joseph M Rocca
*Assistant Examiner* — Maurice L Williams
(74) *Attorney, Agent, or Firm* — Michael Best & Friedrich LLP

(57) ABSTRACT

A bicycle having a rear wheel including an axle, a hub shell, a torque element including a torque output portion and a torque input portion, and a rear cog coupled to the torque input portion. The torque output portion is a first radial distance from the torque input portion. The position sensor measures a rotational position of the torque input portion relative to the torque output portion. In one embodiment, the position sensor includes a displacement indicator (e.g., a radial tab mounted to the torque output portion) and a displacement sensor (e.g., an inductive sensor mounted to the torque input portion). The inductive sensor preferably has two sensing coils positioned on each side of the displacement indicator. The hub assembly can further comprise a wireless transmitter adapted to transmit data from the position sensor. The hub shell preferably includes a window that facilitates data transmission from the wireless transmitter.

14 Claims, 7 Drawing Sheets

(51) Int. Cl.
  *B60B 27/04* (2006.01)
  *B62K 25/02* (2006.01)
  *G01L 5/13* (2006.01)
  *G01L 3/10* (2006.01)
  *G01L 3/14* (2006.01)
  *B62M 6/80* (2010.01)
  *B62M 9/10* (2006.01)
  *B62J 99/00* (2020.01)

(52) U.S. Cl.
  CPC ............ *B62K 25/02* (2013.01); *B62M 9/10* (2013.01); *G01L 3/105* (2013.01); *G01L 5/13* (2013.01); *B62J 2099/002* (2013.01); *B62J 2099/004* (2013.01)

(56) References Cited

U.S. PATENT DOCUMENTS

| | | | |
|---|---|---|---|
| 6,418,797 B1 | 7/2002 | Ambrosina et al. | |
| 7,599,806 B2 | 10/2009 | Hauschildt | |
| 7,775,128 B2 | 8/2010 | Roessingh et al. | |
| 7,806,006 B2 | 10/2010 | Phillips et al. | |
| 7,975,561 B1 | 7/2011 | Ambrosina et al. | |
| 8,006,574 B2 | 8/2011 | Meyer | |
| 8,141,438 B2 | 3/2012 | Roessingh et al. | |
| 8,336,400 B2 | 12/2012 | Lassanske | |
| 8,370,087 B2 | 2/2013 | Zhu et al. | |
| 8,584,529 B2 | 11/2013 | Fisher et al. | |
| 8,607,647 B1 | 12/2013 | Wilson et al. | |
| 8,620,600 B2 | 12/2013 | Vock et al. | |
| 8,677,837 B2 | 3/2014 | Mercat et al. | |
| 8,689,645 B2 | 4/2014 | Watarai | |
| 8,800,389 B2 | 8/2014 | Tetsuka | |
| 8,825,279 B2 | 9/2014 | Kitamura et al. | |
| 8,833,182 B2 | 9/2014 | Tetsuka | |
| 8,881,608 B2 | 11/2014 | Tetsuka et al. | |
| 8,899,110 B2 | 12/2014 | Matsumoto | |
| 8,950,825 B2 | 2/2015 | Kitamura | |
| 8,984,962 B2 | 3/2015 | Christmann | |
| 8,984,963 B2 | 3/2015 | Christmann | |
| 9,010,201 B2 | 4/2015 | Kodama et al. | |
| 9,016,802 B2 | 4/2015 | Kitamura | |
| 9,020,694 B2 | 4/2015 | Kitamura | |
| 9,063,024 B2 | 6/2015 | Kitamura | |
| 9,063,026 B2 | 6/2015 | Nassef | |
| 9,097,598 B2 | 8/2015 | Grassi | |
| 9,150,278 B2 | 10/2015 | Lukatela | |
| 9,150,279 B2 | 10/2015 | Gros et al. | |
| 9,182,304 B2 | 11/2015 | Namiki et al. | |
| 9,191,038 B2 | 11/2015 | Abe et al. | |
| 9,310,264 B2 | 4/2016 | David et al. | |
| 9,322,725 B2 | 4/2016 | Tetsuka et al. | |
| 9,341,526 B2 | 5/2016 | Bass et al. | |
| 9,354,131 B2 | 5/2016 | Lubarsky | |
| 9,404,819 B2 | 8/2016 | Zhu et al. | |
| 9,417,144 B2 | 8/2016 | Lull et al. | |
| 9,423,310 B2 | 8/2016 | Tetsuka | |
| 10,011,322 B2 * | 7/2018 | Piele | B60B 27/023 |
| 2005/0275561 A1 * | 12/2005 | Kolda | B60B 27/0068 340/870.07 |
| 2009/0120210 A1 | 5/2009 | Phillips et al. | |
| 2009/0190923 A1 * | 7/2009 | Nishino | H04B 10/25 398/26 |
| 2010/0263468 A1 | 10/2010 | Fisher et al. | |
| 2011/0040500 A1 | 2/2011 | Zhu et al. | |
| 2011/0240624 A1 * | 10/2011 | Zhang | H04B 10/801 219/209 |
| 2012/0022800 A1 | 1/2012 | Lubarsky | |
| 2012/0166105 A1 | 6/2012 | Biermann et al. | |
| 2012/0173167 A1 | 7/2012 | Lukatela | |
| 2012/0322621 A1 | 12/2012 | Bingham, Jr. et al. | |
| 2013/0024137 A1 | 1/2013 | Grassi | |
| 2013/0047723 A1 | 2/2013 | Tacx | |
| 2013/0049445 A1 | 2/2013 | Kitamura | |
| 2013/0157804 A1 | 6/2013 | Petron | |
| 2013/0210583 A1 | 8/2013 | Kametani et al. | |
| 2013/0214998 A1 | 8/2013 | Andes et al. | |
| 2014/0165744 A1 | 6/2014 | Lull et al. | |
| 2014/0171258 A1 | 6/2014 | Boudet | |
| 2014/0171266 A1 | 6/2014 | Hawkins, III et al. | |
| 2014/0202262 A1 | 7/2014 | Mercat et al. | |
| 2014/0202264 A1 | 7/2014 | Vock et al. | |
| 2014/0283622 A1 | 9/2014 | Namiki et al. | |
| 2014/0361932 A1 * | 12/2014 | Irci | H01Q 1/243 343/702 |
| 2015/0081062 A1 | 3/2015 | Fyfe et al. | |
| 2015/0168101 A1 * | 6/2015 | Hyde | F41C 33/06 206/317 |
| 2015/0355042 A1 | 12/2015 | Kodama et al. | |
| 2016/0052583 A1 | 2/2016 | Sasaki | |
| 2016/0052584 A1 | 2/2016 | Sasaki | |
| 2016/0075177 A1 | 3/2016 | Biderman et al. | |
| 2016/0192407 A1 | 6/2016 | Fyfe et al. | |
| 2016/0209281 A1 | 7/2016 | Carrasco Vergara et al. | |
| 2017/0052432 A1 * | 2/2017 | Taxier | G03B 17/561 |
| 2018/0011122 A1 * | 1/2018 | Nichols | G01P 3/00 |

FOREIGN PATENT DOCUMENTS

| | | |
|---|---|---|
| WO | 2015087164 A1 | 6/2015 |
| WO | 2015101947 A2 | 7/2015 |
| WO | 2016030768 A2 | 3/2016 |
| WO | 2016103047 A1 | 6/2016 |

* cited by examiner

BICYCLE WHEEL HUB WITH POWER METER

BACKGROUND

The present invention relates to bicycle wheel hubs with power meters.

Cyclists are often looking for tools for training. For example, bicycles are often provided with sensors and processors for measuring speed, distance, and cadence (often called "bike computers"). In addition, pulse monitors can be used to provide the rider with real time data on the user's heart rate.

Recent improvements in electronics technology have resulted in the development of devices for measuring the power generated by the cyclist, often called "power meters." There are different types of power meters, but most are based on the calculation of power based on torque multiplied by cadence. Torque can be measured in a variety of ways, such as by measuring force on the pedals multiplied by length of the crank arm, or force in the chain multiplied by radius of the chainring.

Some power meters are located in the hub of the rear wheel of the bicycle. Some of those hub-based power meters measure torque using a diagonal strain gage positioned on a torque tube positioned inside the rear hub. The torque tube transmits the torque from a rear cog to the hub shell. The measured torque can then be multiplied by the rpm of the rear wheel in order to determine power.

SUMMARY

It can be appreciated that the use of a torque tube in the rear hub of a bicycle wheel adds weight and rotational inertia to the rear wheel, which is generally undesirable in a bicycle. In addition, the diagonal strain gage described above must be able to measure extremely small strains in the torque tube, which can be difficult to calibrate and keep calibrated.

The present invention provides a bicycle having a frame, a front wheel supporting the frame, a rear wheel supporting the frame, and a position sensor. The rear wheel includes an axle secured to the frame, a hub shell mounted for rotation on the axle about a rotational axis, a torque element including a torque output portion coupled to the hub and a torque input portion, and a rear cog coupled to the torque input portion. The torque input portion is a first radial distance from the rotational axis and the torque output portion being at a second radial distance from the rotational axis, the first radial distance being different than the second radial distance. For example, the torque output portion can be directly radially outward of the torque input portion. The position sensor measures a rotational position of the torque input portion relative to the torque output portion. Preferably, the torque element further includes a plurality of torque spokes coupling the torque input portion to the torque output portion. For example, the torque spokes can be oriented substantially radial to the rotational axis.

In one embodiment, the position sensor includes a displacement indicator mounted to and movable with one of the torque input portion and the torque output portion, and a displacement sensor mounted to and movable with the other of the torque input portion and the torque output portion. The displacement indicator is preferably a radial tab mounted to the torque output portion. The displacement sensor is positioned to measure a position of the displacement indicator relative to the displacement sensor. Preferably, the displacement sensor comprises an inductive sensor. For example, the inductive sensor can include a sensing coil, and preferably two sensing coils, on each side of the displacement indicator.

If desired, the hub assembly can further comprise a wireless transmitter adapted to transmit data from the position sensor. In this embodiment, the hub shell preferably includes a window (e.g., a plurality of windows spaced circumferentially around the hub shell) that facilitates data transmission from the wireless transmitter.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
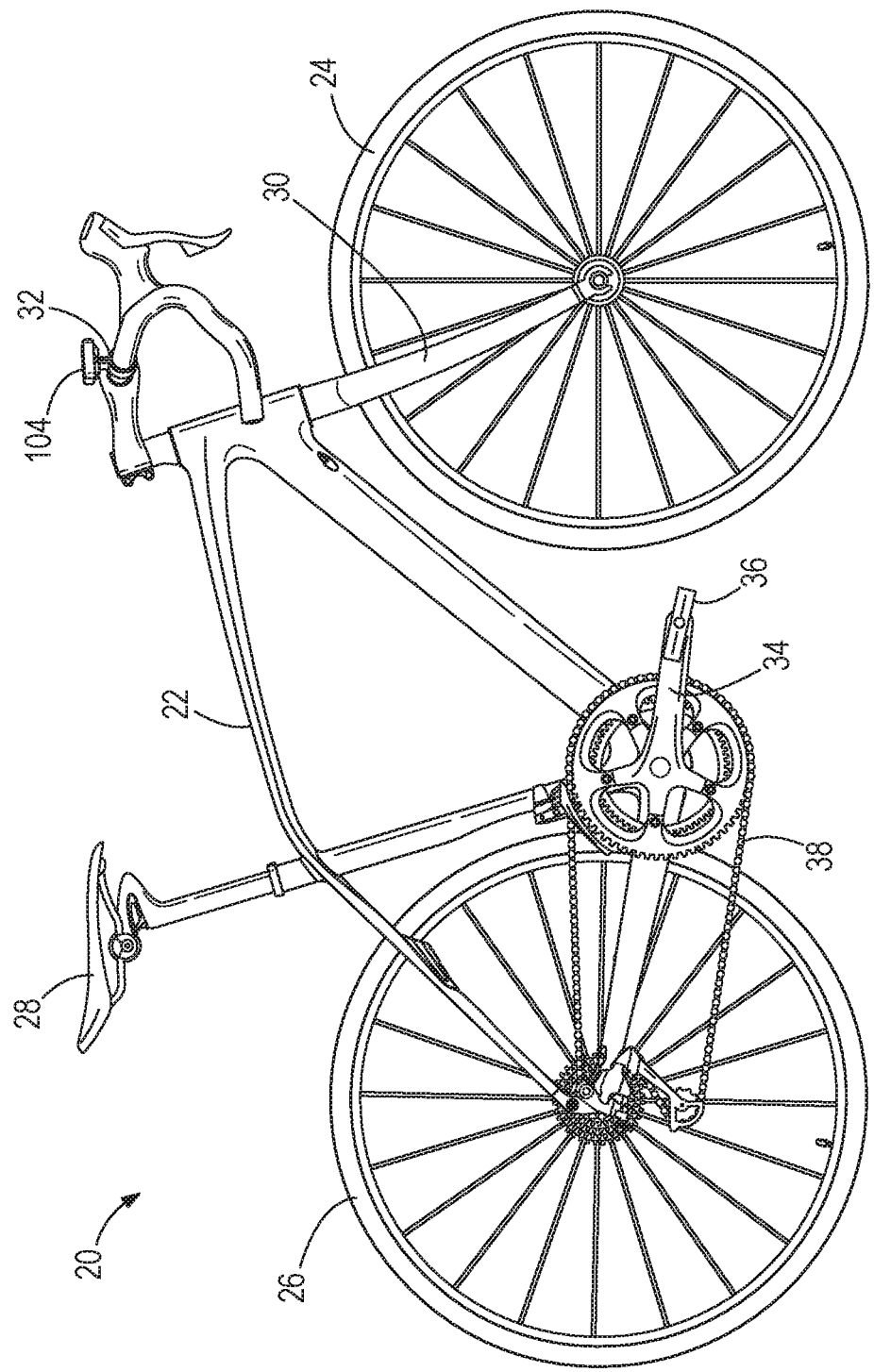
FIG. 1 is a side view of a bicycle having a hub-based power meter embodying the present invention.

FIG. 1 illustrates a bicycle 20 having a frame 22, a front wheel 24 supporting the frame 22, and a rear wheel 26 supporting the frame 22. The bicycle 20 further includes a seat 28 for supporting the rider, a front fork 30 coupling the front wheel 24 to the frame 22, and handlebars 32 that facilitate steering the bicycle 20. A crank 34 includes pedals 36 for driving a chain 38 that drives the rear wheel 26.

Figure 2:
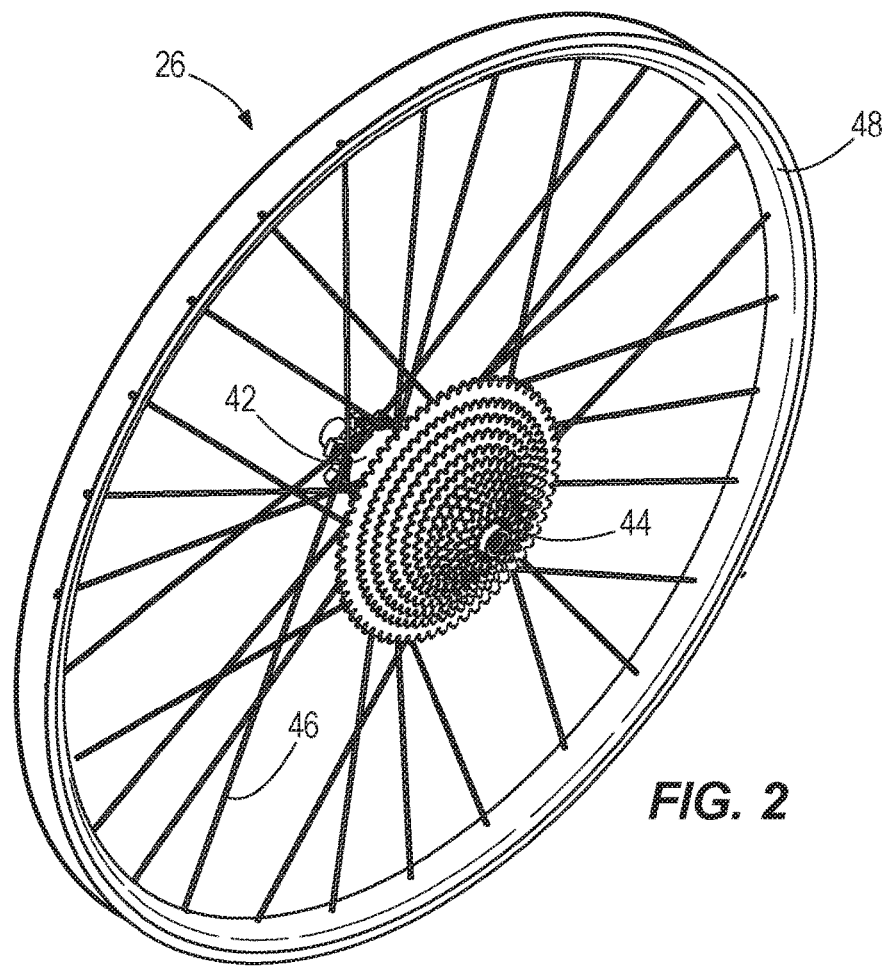
FIG. 2 is a perspective view of a rear wheel from the bicycle in FIG. 1.
Figure 3:
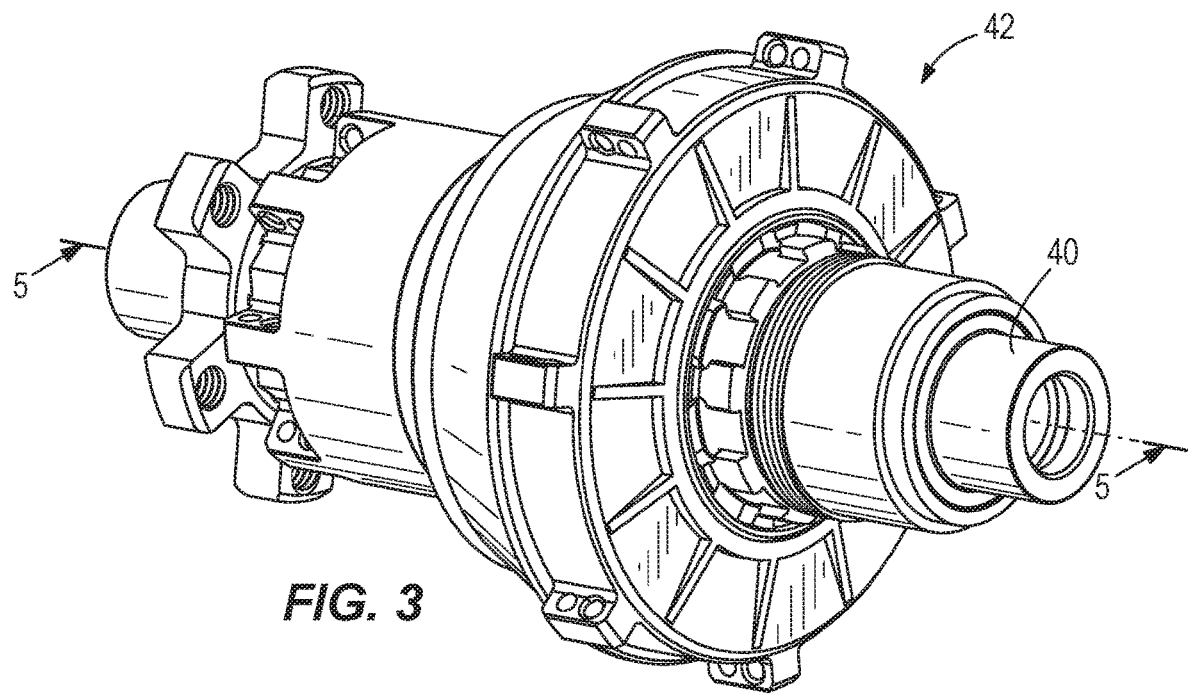
FIG. 3 is a perspective view of a rear hub assembly from the rear wheel in FIG. 2.

Referring to FIGS. 2-3, the rear wheel 26 includes an axle 40 adapted to be secured to the frame 22, a hub assembly 42 rotationally supported on the axle 40, a cogset 44 coupled to the hub assembly 42, a plurality of spokes 46 extending radially outward from the hub assembly 42, and a rim 48 secured to the radially outer ends of the spokes 46 and adapted to receive a tire. As is understood in the art, the cogset 44 is adapted to be engaged the chain 38 to facilitate the transfer of power to the rear wheel 26.

Figure 4:
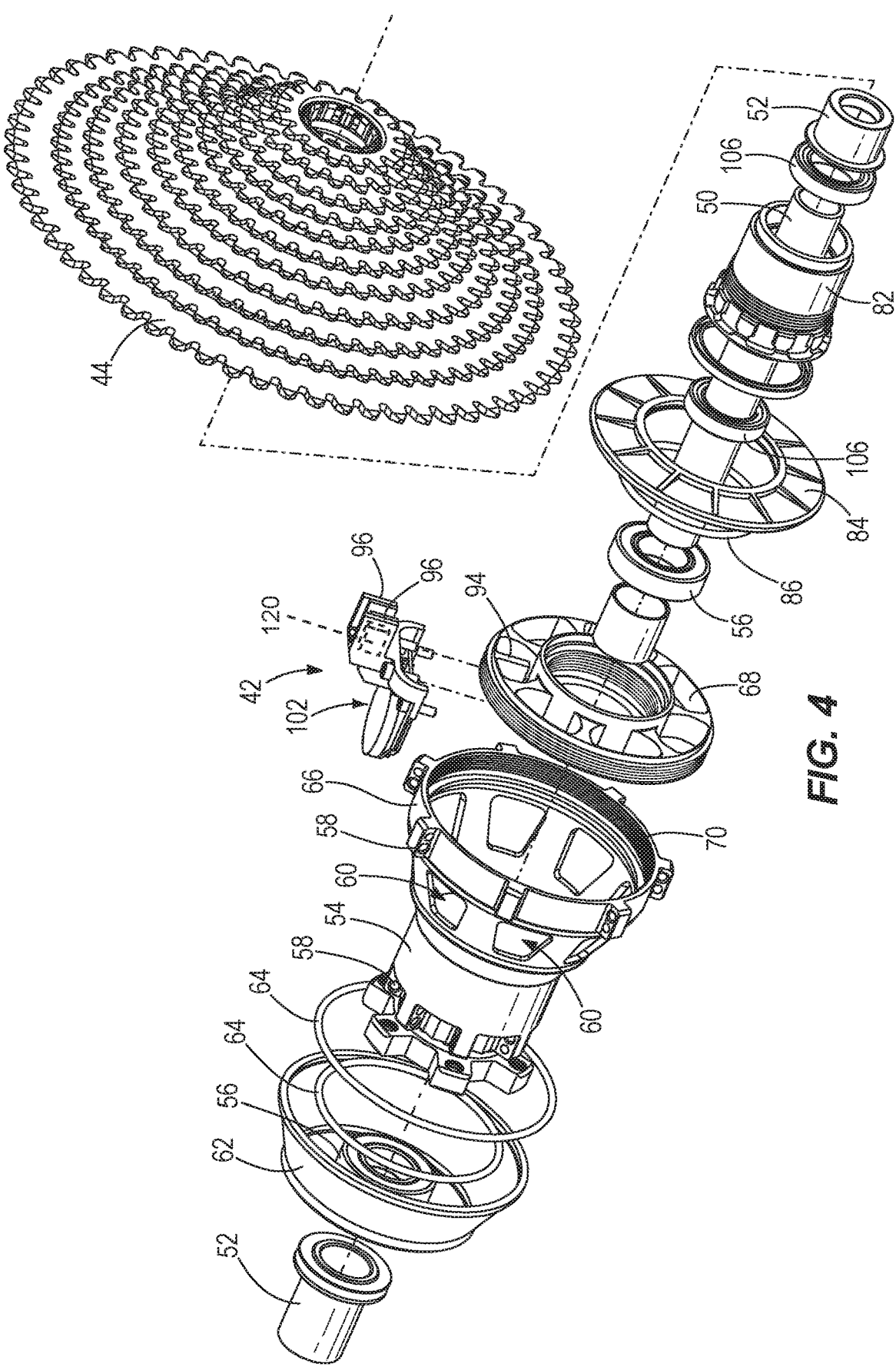
FIG. 4 is an exploded view of the rear hub assembly of FIG. 3.
Figure 5:
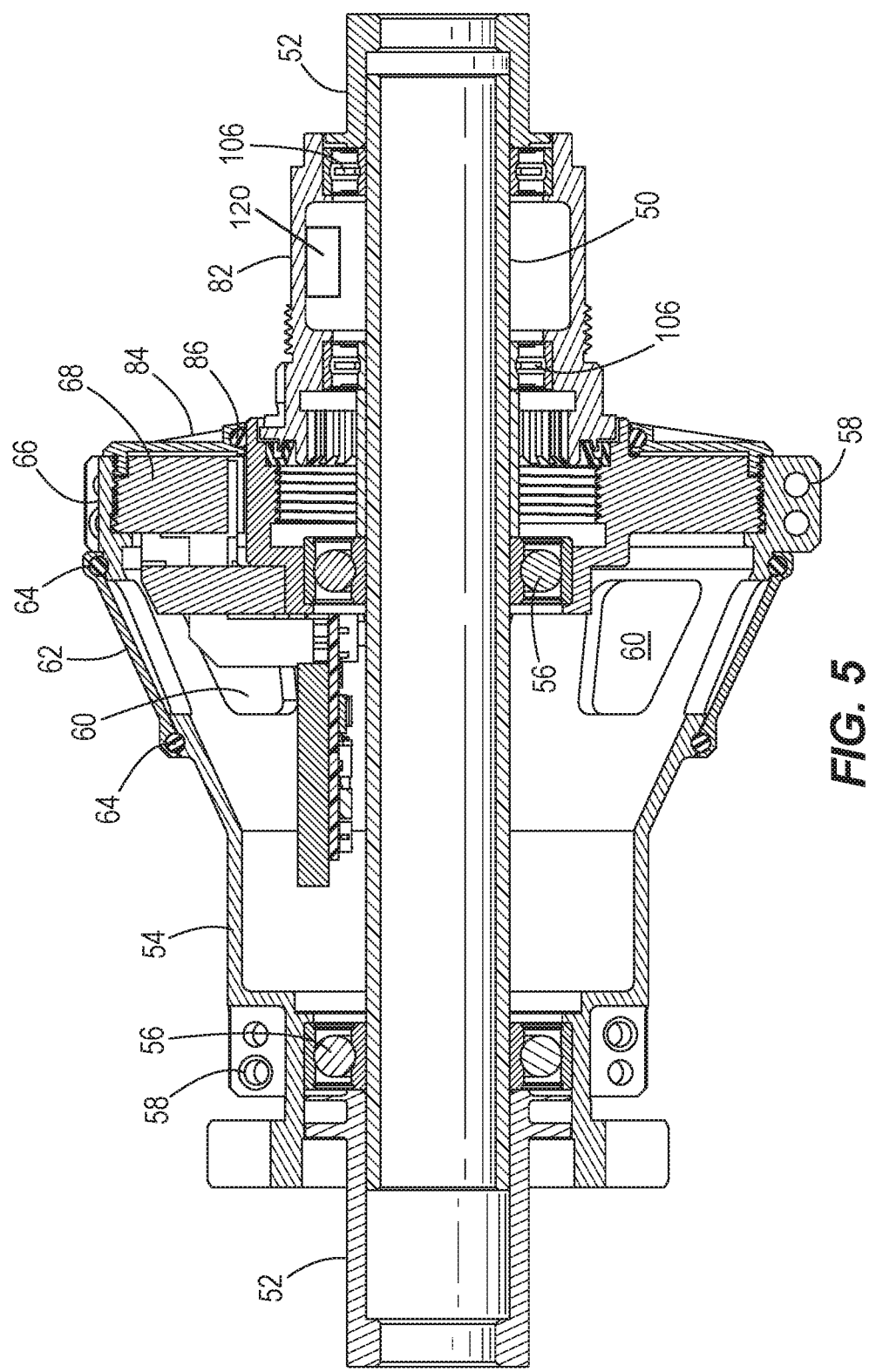
FIG. 5 is a cross section of the rear hub assembly taken along line 5-5 in FIG. 3.

The hub assembly 42 and axle 40 are shown in more detail in FIGS. 4-5. The axle 40 includes a main axle 50 and spacers 52 positioned on opposing ends of the main axle 50. The main axle 50 and spacers 52 are designed to be rigidly secured to the bicycle frame 22, as is known in the art.

The hub assembly 42 includes a hub shell 54, supported for rotation on the main axle 50 by two wheel bearings 56. The hub shell 54 includes a series of spoke mounts 58 adapted to engage the inner ends of the spokes 46. The hub shell 54 further includes a series of circumferentially spaced windows 60 adapted to improve the transmission of a wireless signal, as described below in more detail. An inner seal 62 is positioned to cover the windows, and two O rings 64 provide a barrier to entry of undesired environmental contaminants, such as dirt and water. The hub shell 54 further includes a torque receiver 66 adapted to receive torque from the cogset 44 via a torque element 68, as described below in more detail. The torque receiver 66 comprises internal threads 70 that facilitate attachment to the torque element 68.

Figure 6:
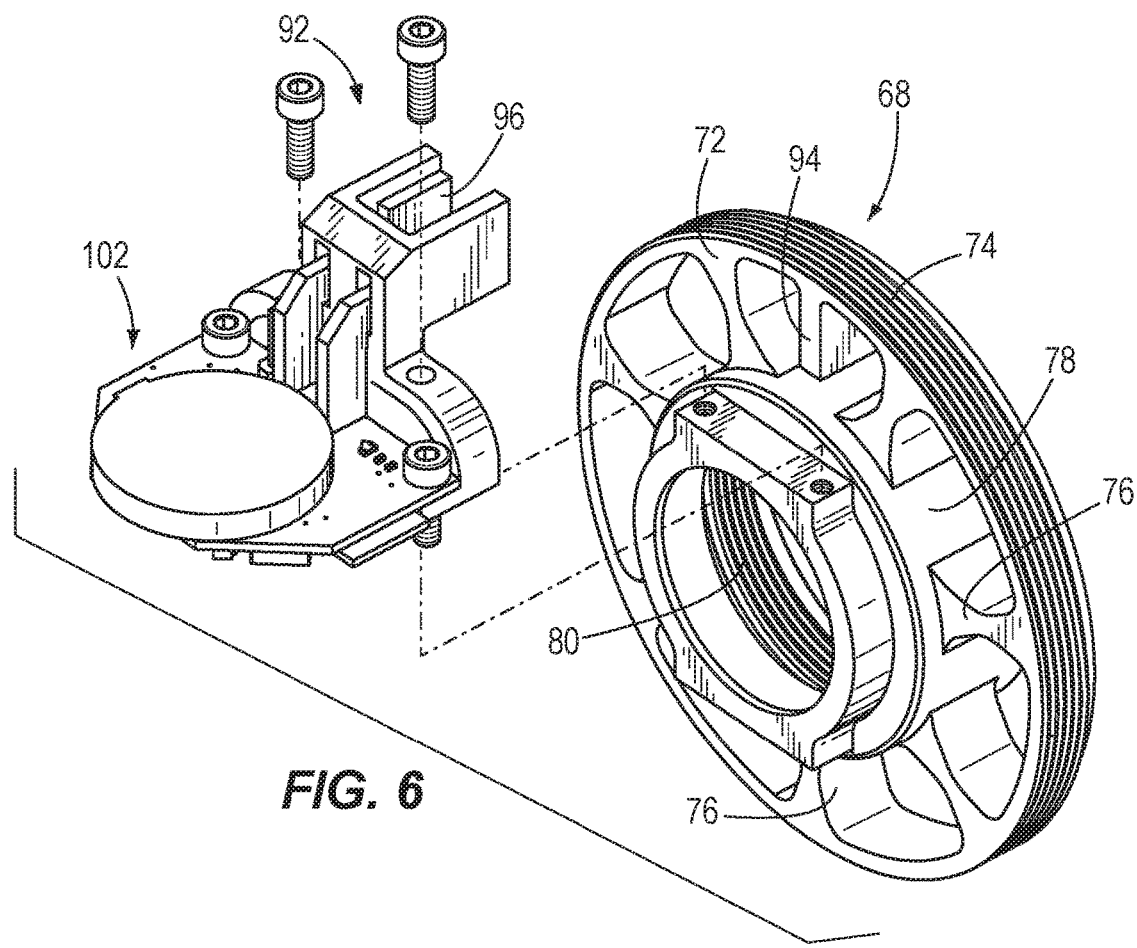
FIG. 6 is an exploded view of a torque sensing assembly from the rear hub assembly of FIG. 5.

Referring to FIG. 6, the torque element 68 includes a torque output portion 72 having external threads 74 dimensioned to thread into the internal threads 70 of the torque receiver 66 in the hub shell 54. A series of seven torque spokes 76 extend radially inward from the torque output portion 72 to a torque input portion 78. The torque input portion 78 includes internal threads 80 that facilitate attachment of the torque input portion 78 to a torque input member 82 or free hub. The torque element 68 is designed such that torque applied to the torque input portion 78 will cause a small rotational offset between the torque input portion 78 and the torque output portion 72 proportional to the amount of torque being applied. In this regard, measurement of this rotational offset provides information that is proportional to the torque applied to the hub assembly 42. The illustrated torque element 68 is machined from a solid block of 7000-series aluminum alloy, but it could instead be made of multiple parts, other materials and other manufacturing processes.

The hub assembly 42 further includes an outer seal 84 and corresponding O rings 86 that protect the interior of the hub assembly 42 from intrusion by contaminants.

The hub assembly 42 further includes a position sensor having a displacement sensor 92 mounted to the torque input portion 78 and a conductive displacement indicator 94 mounted to the torque output portion 72. In the illustrated embodiment, the displacement sensor 92 includes an inductive sensor 96 that measures the change in the inductance of a coil based on the changing proximity of a conductor, in this case the conductive displacement indicator 94. This change in inductance is proportional to the change in distance between the displacement sensor 92 and the displacement indicator 94, and will thus be proportional to the torque between the two parts.

Figure 8:
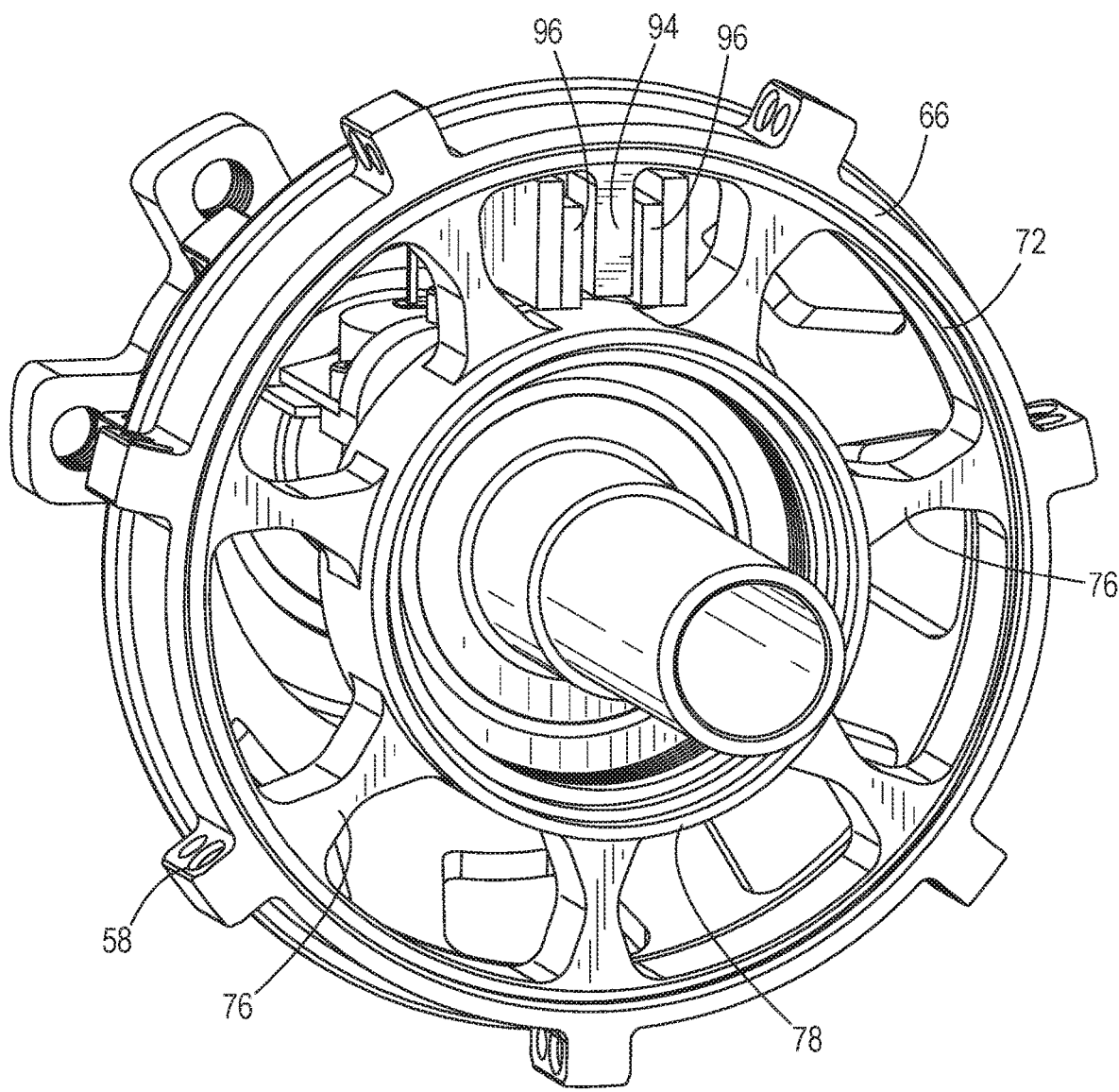
FIG. 8 is a right side view of the torque sensing assembly.
Figure 9:
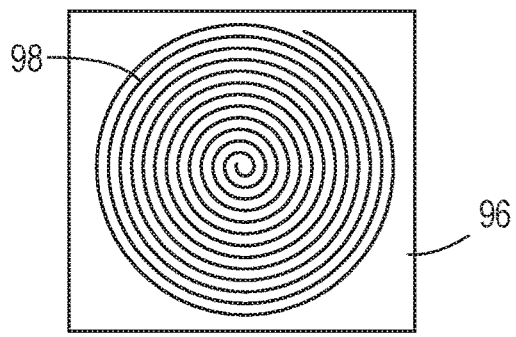
FIG. 9 is a plan view of an inductive sensor used in the torque sensing assembly.

In order to improve accuracy and reduce errors due to the effects of thermal expansion and sensor misalignment, the preferred displacement sensor 92 shown in FIG. 8 includes an inductive sensor 96 positioned on each side of the displacement indicator 94. As shown in FIG. 9, each inductive sensor 96 includes a coil 98 that is metal etched onto a printed circuit board. Each sensor communicates with a processor including a high resolution, inductance to digital converter (e.g., Texas Instruments model LDC-1000). The processor is programmed to convert the inductance reading into a calculation of displacement of the displacement indicator 94 relative to the displacement sensor 92.

Figure 7:
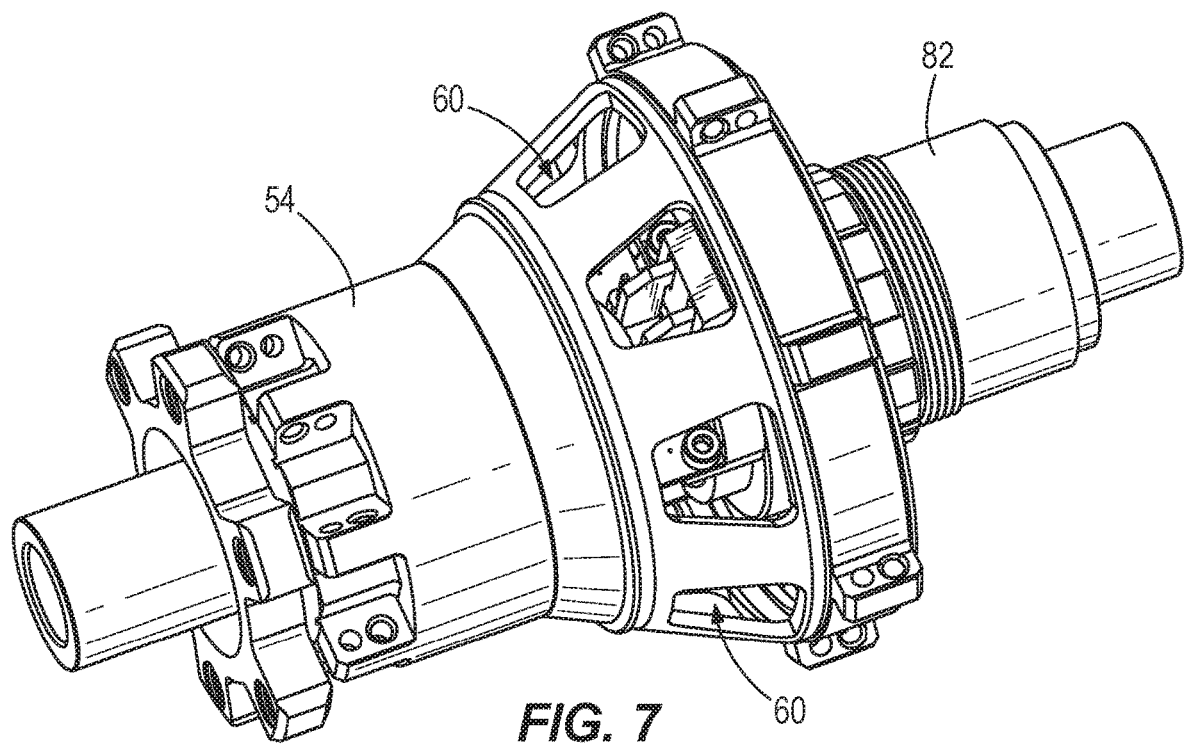
FIG. 7 is a perspective view of the rear hub assembly with an inner seal removed to show transmission windows.

The illustrated conductive displacement indicator 94 comprises a radial tab that extends radially inward from the torque output portion 72 but does not extend all the way to the torque input portion 78. The illustrated tab is formed integrally with the torque element 68 and thus is made from a 700-series aluminum alloy. As illustrated in FIGS. 6-8, the displacement sensor 92 (comprising inductive sensors 96) is positioned in proximity to the displacement indicator 94 and will provide a signal proportional to the position of the displacement indicator 94, which is mounted to the torque output portion 72, relative to the displacement sensor 92, which is mounted to the torque input portion 78. In this way, the displacement or rotation of the torque input portion 78 relative to the torque output portion 72 can be measured.

The processor communicates with a wireless transceiver 102 (e.g., a Dynastream N5 chip, which utilizes a Nordic Semiconductor nRF51422 unit to transmit power via ANT+ and Bluetooth) that facilitates two-way communication with a head unit 104 using ANT+ wireless protocol defined and standardized by the ANT Alliance. For example, a head unit 104 having a display can be positioned on the bicycle handlebars 32 for viewing by the cyclist, as shown in FIG. 1. Alternatively, other forms of wireless communication (e.g., Bluetooth) can be used. In addition, the receiver can include a processor and storage device so that the data can be analyzed and stored.

The illustrated torque input member 82 is a free hub that is supported for rotation on the axle 40 by free hub bearings 106. The torque input member 82 is ratcheted to the torque input portion 78 for one way torque transmission, as is generally known in the art. For example, a star-ratchet connection from DT Swiss could be used, although other freehub connections could instead be used. The cogset 44 is secured to the torque input member 82 to facilitate transmission of torque from a bicycle chain to the torque input member 82.

Figure 10:
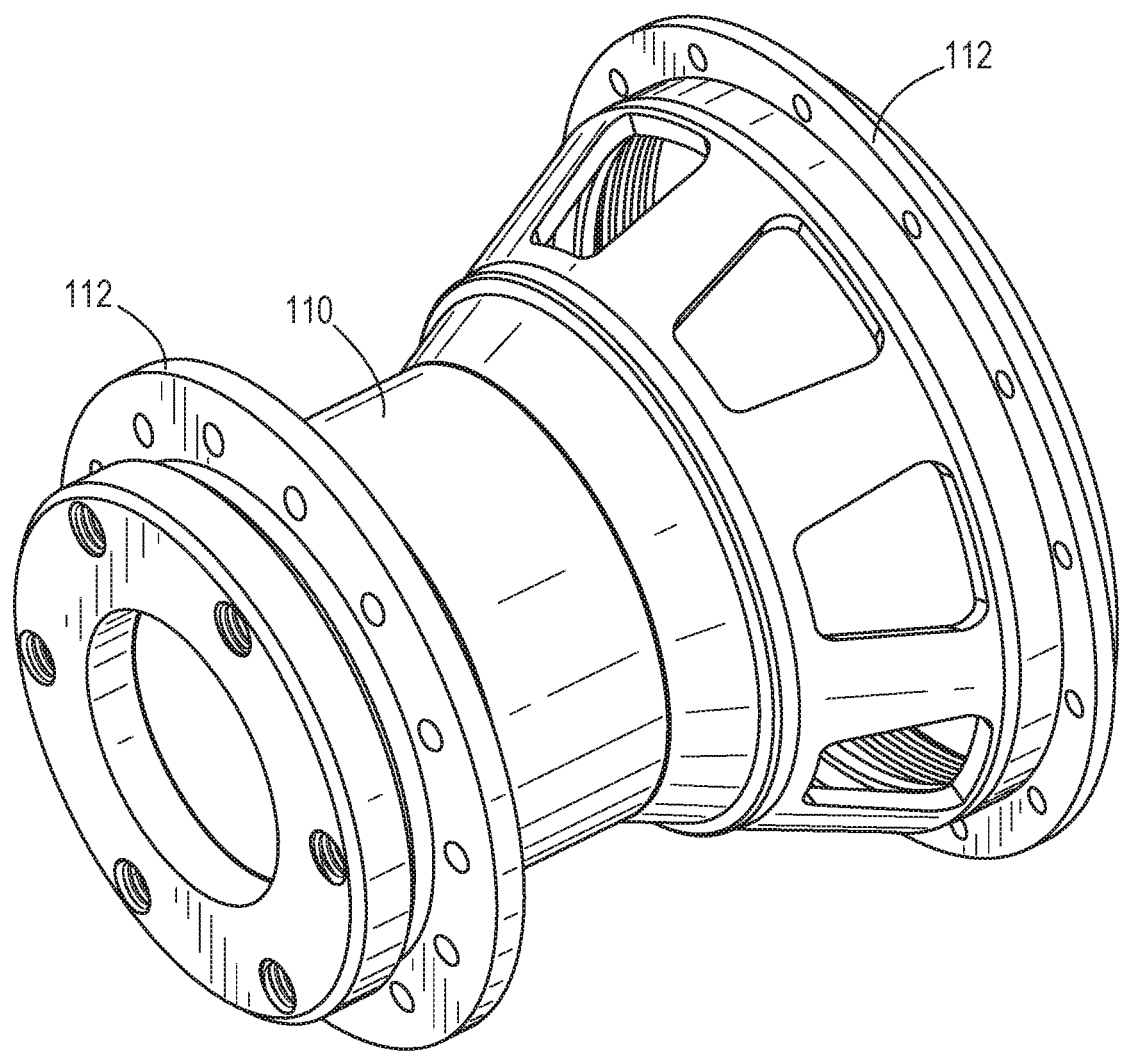
FIG. 10 is a perspective view of an alternative hub shell that can be used to practice the present invention.

FIG. 10 illustrates an alternative hub shell 110 having spoke flanges 112 instead of separate spoke mounts 58.

With many types of torque sensors (such as the above-described displacement sensor and torque element), it is often desirable to calibrate the torque sensor in order to account for changes in torque readings over time (e.g., due to changes in temperature or other changing variables). One way to do this is to "zero out" the torque sensor, which typically involves resetting the zero torque value when no load is being applied to the system (e.g., before the user starts pedaling). However, because torque sensor calibration can change during an exercise session, zeroing out the torque during an exercise session typically requires that the user stop exercising (i.e., remove the user's feet from the pedals so no torque is being applied), which is inconvenient.

In this regard, the present invention provides the ability to automatically zero out the torque sensor during the exercise session. This is accomplished by sensing when the user is coasting (i.e., no torque being applied by the user), and then using that opportunity to zero out the torque sensor. For example, the system can have a simple motion sensor 120 that provides a "coasting signal" that detects relative motion between the hub shell 54 and the cogset 44 or torque input member 82. In one embodiment (FIG. 5), the motion sensor 120 (shown schematically) is positioned on an inner surface of the torque input member 82, between the free hub bearings 106, in order to measure motion of the torque input member 82 relative to the main axle 50. If no motion is detected, it can be inferred that the rider is coasting. In another embodiment (FIG. 4), the motion sensor 120 (shown schematically in broken lines) is mounted to the side of the bracket supporting the inductive sensors 96 in order to detect motion of the hub shell 54 relative to the cogset 44. If motion is detected, it can be inferred that the user is coasting. Such a sensor 120 could include a mechanical switch; a magnet and coil; a magnet and hall effect sensor; an LED, a photo transistor and a moving part having slots which emit the light; and a piezoelectric sensor. When it is inferred that the user is coasting, an "on-the-fly" calibration of the torque sensor can be automatically performed. Alternatively, many bicycle computers have a cadence sensor, and the output from the cadence sensor can be used to detect when the user is not pedaling. This "on-the-fly" calibration can occur automatically, without the need for user input, so that the torque sensor can be recalibrated throughout the user's ride.

Various features and advantages of the invention are set forth in the following claims.

What is claimed is:

1. A bicycle comprising:
   a frame;
   a front wheel supporting the frame;
   a rear wheel supporting the frame and including:
      an axle secured to the frame;
      a hub shell mounted for rotation on the axle about a rotational axis;
      a torque element configured to transmit torque, the torque element including a torque output portion coupled to the hub shell and a torque input portion, the torque input portion being a first radial distance from the rotational axis along a radial plane and the torque output portion being at a second radial distance from the rotational axis along the radial plane, the first radial distance being different than the second radial distance;
      a rear cog coupled to the torque input portion; and
      a position sensor positioned along the radial plane that measures a rotational position of the torque input portion relative to the torque output portion, wherein the position sensor includes,
         a displacement indicator mounted to and movable with one of the torque input portion and the torque output portion, and
         a displacement sensor mounted to and movable with the other of the torque input portion and the torque output portion, the displacement sensor being positioned to measure a position of the displacement indicator relative to the displacement sensor.

2. A bicycle as claimed in claim 1, wherein the torque element further includes a plurality of torque spokes coupling the torque input portion to the torque output portion.

3. A bicycle as claimed in claim 2, wherein the torque spokes are oriented substantially radial to the rotational axis.

4. A bicycle as claimed in claim 1, wherein the displacement sensor comprises an inductive sensor.

5. A bicycle as claimed in claim 4, wherein the inductive sensor comprises a sensing coil.

6. A bicycle as claimed in claim 4, wherein the inductive sensor comprises a sensing coil positioned on a side of the displacement indicator.

7. A bicycle as claimed in claim 4, wherein the inductive sensor comprises a sensing coil positioned circumferentially adjacent the displacement indicator.

8. A bicycle as claimed in claim 1, wherein the displacement indicator is mounted to the torque output portion.

9. A bicycle as claimed in claim 8, wherein the displacement indicator comprises a radial tab extending radially inward from the torque output portion.

10. A bicycle as claimed in claim 1, wherein the torque output portion is directly radially outward of the torque input portion.

11. A bicycle as claimed in claim 1, further comprising a wireless transmitter adapted to transmit data from the position sensor, wherein the hub shell includes a window that facilitates data transmission from the wireless transmitter.

12. A bicycle as claimed in claim 11, wherein the window comprises a plurality of windows spaced circumferentially around the hub shell.

13. The bicycle as claimed in claim 1, wherein both the displacement indicator and the displacement sensor are each positioned along the radial plane.

14. The bicycle as claimed in claim 1, wherein the displacement indicator is mounted directly to and movable with the one of the torque input portion and the torque output portion, and the displacement sensor is mounted directly to and movable with the other of the torque input portion and the torque output portion.

* * * * *